(12) United States Patent
Black

(10) Patent No.: US 8,805,712 B2
(45) Date of Patent: Aug. 12, 2014

(54) WIRELESS NETWORK HOTEL ROOM MANAGEMENT SYSTEM

(76) Inventor: Hobson L. Black, Avon, CO (US)

(*) Notice: Subject to any disclaimer, the term of this patent is extended or adjusted under 35 U.S.C. 154(b) by 328 days.

(21) Appl. No.: 13/270,589

(22) Filed: Oct. 11, 2011

(65) Prior Publication Data

US 2013/0088320 A1    Apr. 11, 2013

(51) Int. Cl.
*G06Q 10/00* (2012.01)
(52) U.S. Cl.
USPC ............ 705/5; 705/7.13; 705/7.15; 705/314; 340/286.06; 340/286.08
(58) Field of Classification Search
USPC ............ 340/4.6, 5.2, 5.6, 5.7, 539.1, 539.11, 340/539.13, 539.16–539.18, 539.22, 573.1, 340/286.06; 705/5, 7.11–7.42, 314
See application file for complete search history.

(56) References Cited

U.S. PATENT DOCUMENTS

| | | | |
|---|---|---|---|
| 5,463,546 A * | 10/1995 | Parkhurst | 705/5 |
| 6,731,200 B2 | 5/2004 | Wagner et al. | |
| 7,076,451 B1 | 7/2006 | Coupland et al. | |
| 7,170,407 B2 | 1/2007 | Wagner | |
| 7,315,823 B2 | 1/2008 | Brondrup | |
| 2004/0019513 A1* | 1/2004 | Colalancia et al. | 705/9 |
| 2004/0083128 A1* | 4/2004 | Buckingham et al. | 705/10 |
| 2005/0021379 A1 | 1/2005 | Ishibashi | |
| 2005/0030176 A1* | 2/2005 | Wagner | 340/539.13 |
| 2005/0210283 A1* | 9/2005 | Kato | 713/200 |
| 2007/0050197 A1* | 3/2007 | Efron et al. | 705/1 |
| 2009/0271207 A1* | 10/2009 | Lanigan et al. | 705/1 |
| 2009/0299777 A1 | 12/2009 | Silberman | |
| 2012/0320215 A1* | 12/2012 | Maddi | 348/155 |

* cited by examiner

*Primary Examiner* — Brian Zimmerman
*Assistant Examiner* — Laura Nguyen
(74) *Attorney, Agent, or Firm* — Dale J. Ream

(57) ABSTRACT

A wireless network hotel room management system includes a communications network. The system includes a computer connected to the communications network and includes a memory configured to store programming and a processor to execute the programming. A guest room unit is situated in each guest room and is in data communication with the network. A housekeeping module is in communication with the network. The computer monitors real time status of the room. Each guest unit is configured to receive projected absence data from a guest and to communicate the same to the computer through the communications network. Programming executed by the processor determines if received projected absence data is indicative that a guest will be gone long enough for housekeeping to clean the room and, if so, communicates a housekeeping order. The system includes a room reservation module for reserving a room and receiving a room key.

20 Claims, 7 Drawing Sheets

WIRELESS NETWORK HOTEL ROOM MANAGEMENT SYSTEM

BACKGROUND OF THE INVENTION

This invention relates generally to hotel management systems and, more particularly, to a wireless network hotel room management system for use by a hotel having a plurality of guest rooms for reserving a room, indicating the current occupancy status of a room, and indicating status of a housekeeping event—all in real time.

Hotel room management refers to several things. For instance, hotels have multiple rooms that are continuously being reserved, providing lodging to guests, being cleaned when a guest is not in the room, and being cleaned when a guest has checked out so as to be ready for a next guest. Each of these aspects of room management include inefficiencies and disadvantages. For example, a guest is traditionally required to stop at a front desk to check in and be given a room access key. Once in the room, the guest may hang a "Do-not-Disturb" sign on the outside of his door so as to indicate to housekeeping his desire that the room not be cleaned at that time. Housekeeping must actually pass by the room—possibly multiple times—to determine if it may be cleaned. Further, housekeeping typically must visually check each room to determine if the guest is not present and then takes the risk that the room may be cleaned before the guest returns.

Various systems have been proposed in the art to assist a user in reserving a hotel room, for visually indicating on the outside of a room door if housekeeping is or is not requested, and the like. Although assumably effective for their intended purposes, there is still a need for real time occupancy status of every guest room in a hotel or resort and for information that informs housekeeping when a respective guest room may be cleaned.

Therefore, it would be desirable to have a hotel room management system that enables an online user to determine room availability, to reserve a room, and to receive a room key so that he may access the reserved room at the appropriate time without stopping at the hotel's front desk. Further, it would be desirable to have a hotel room management system that monitors guest occupancy in the reserved room in real time and determines whether housekeeping is either desired or possible. Still further, it would be desirable to have a hotel room management system monitors the time housekeeping is in a guest room so as to make sure housekeeping is completed before a guest returns, a new guest arrives, or just to maximize efficiency. In addition, it would be desirable to have a hotel room management system that automatically summons housekeeping to a guest room if a guest specifically requests cleaning or indicates that he will be gone from the room for longer than a predetermined time that is sufficient for completion of cleaning.

SUMMARY OF THE INVENTION

A wireless network hotel room management system for use by a hotel having a plurality of guest rooms for reserving a room, indicating the current occupancy status of a room, and indicating status of a housekeeping event includes a communications network configured to send and receive wireless data signals. The system includes a computer in data communication with the communications network, includes a memory configured to store data and programming, and includes a processor configured to execute the programming. The computer monitors real time occupancy status of the room. A guest room unit is situated in each guest room and is in data communication with the communications network. A housekeeping module/process is in communication with the communications network. Each guest unit is configured to receive projected absence data from a guest in a respective guest room and to communicate the projected absence data to the computer through the communications network. Programming executed by the processor determines if received projected absence data indicates a guest will be gone long enough for housekeeping to clean the room and, if so, communicates a housekeeping order.

Therefore, a general object of this invention is to provide a wireless network hotel room management system for monitoring the real time occupancy status of a hotel room including occupancy by a guest or housekeeper.

Another object of this invention is to provide a hotel room management system, as aforesaid, in which a guest inputs a projected amount of time expected to be absent from his room into an electronic guest room unit prior to leaving the room so that the hotel computer may determine if there is time to automatically summon housekeeping to clean the room before the guest returns.

Still another object of this invention is to provide a hotel room management system, as aforesaid, in which housekeeping uses the guest room unit to indicate both a cleaning initiation time and a cleaning completion time such that the real time status of the room is monitored by the hotel computer (and, presumably, the front desk).

Yet another object of this invention is to provide a hotel room management system, as aforesaid, in which each guest room includes a door entry unit in communication with the communications network that signals when a guest key or housekeeping key has been used to actuate the door so as to further monitor the real time status of a room's occupancy.

A further object of this invention is to provide a hotel room management system, as aforesaid, in which a guest may use the guest room unit to indicate a do-not-disturb status and this status is communicated to housekeeping.

A still further object of this invention is to provide a hotel room management system, as aforesaid, that includes an online room reservation module that results in delivery of a guest room access key upon reservation of a room.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figures 1, 2A:
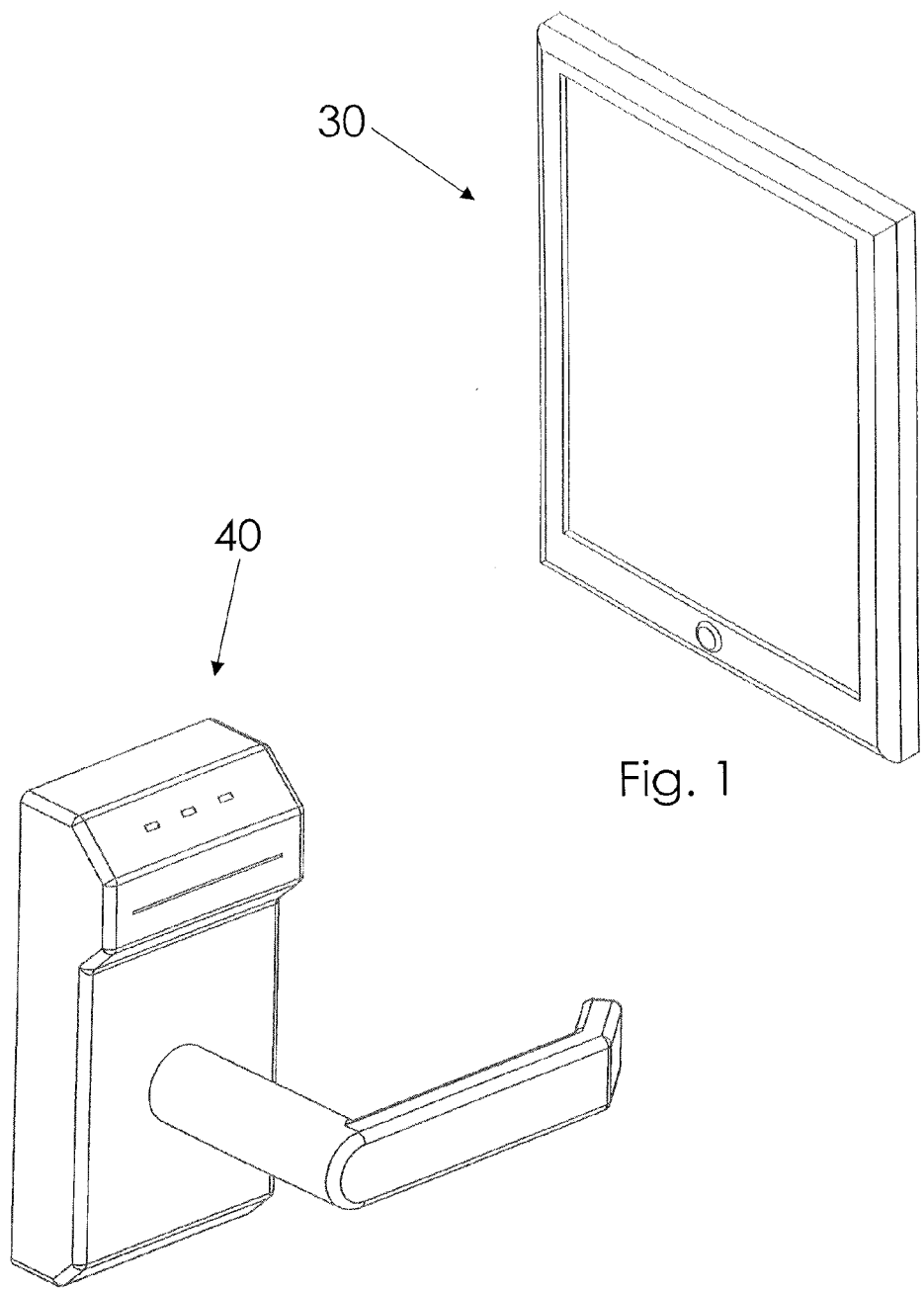
FIG. 1 is a perspective view of an electronic guest room unit of a hotel room management system according to a preferred embodiment of the invention.
FIGS. 2a to 2c are perspective views of a guest room door unit of the hotel room management system.

A wireless network hotel room management system according to a preferred embodiment of the present invention will now be described with reference to FIGS. 1 to 7 of the accompanying drawings. The hotel room management system 10 includes a central/hotel computer 20 having memory 22 and a processor 24, a guest room unit 30, a guest room door unit 40, a housekeeping module 301, and a wireless communications network 12 for managing communications between the system components.

Figure 5:
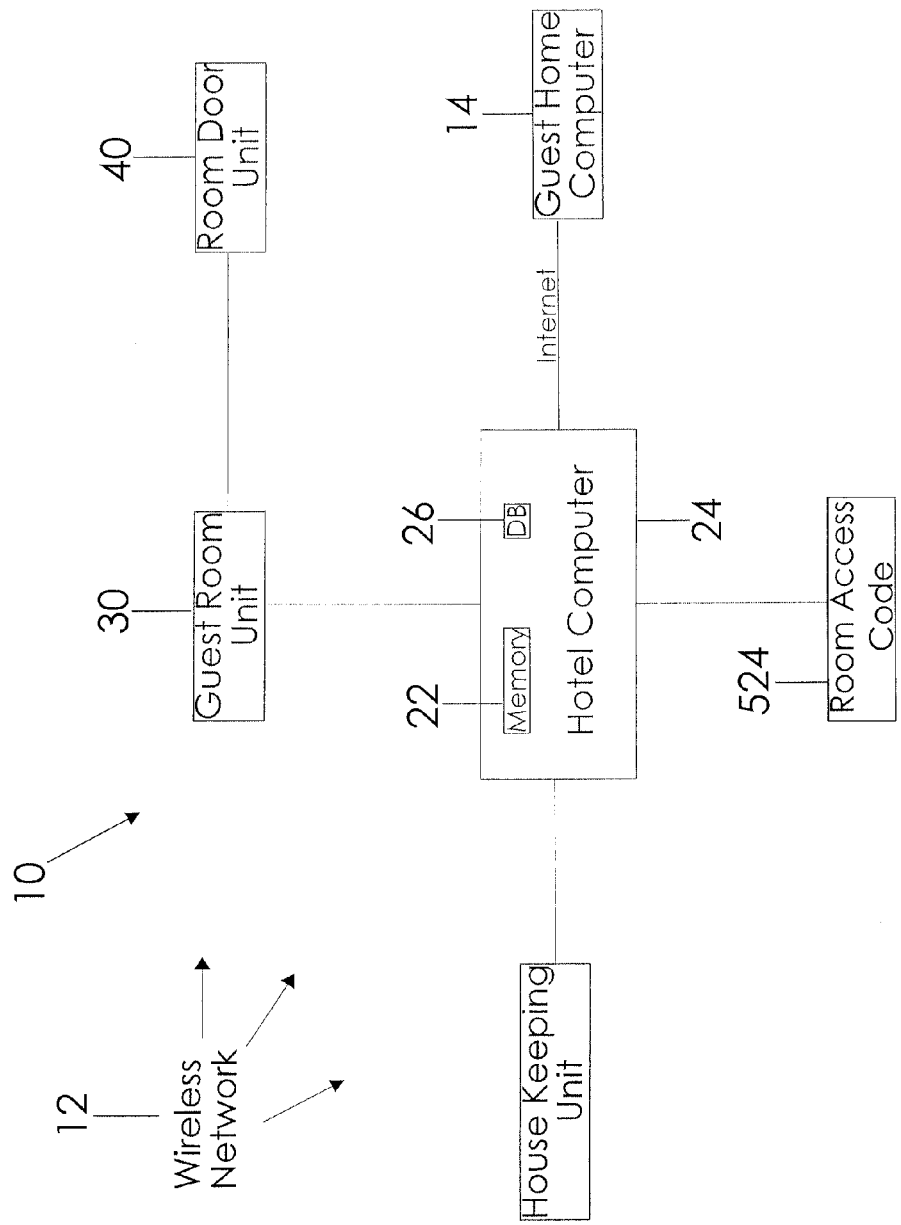
FIG. 5 is a block diagram illustrating the components of the present invention.

The central computer 20 (also referred to as the "hotel computer") may be a network server that is configured to operate an intranet amongst the hotel or a group of hotels as well as being connected to the internet for communications between the hotel, hotel guests, and potential hotel guests. The hotel computer 20 includes a memory 22 configured to store programming and to store data in data structures such as a database 26 (FIG. 5). The computer 20 also includes a processor 24 configured to selectively execute programming stored in the memory 22.

The wireless communications network 12 may include a router (not shown) electrically connected to the computer 20 and configured to transmit data signals into the air for receipt by other system components as to be described in more detail later (FIG. 5). The communications network 12 may include a receiver (not shown) or the like operatively connected to the hotel computer 20 such that the computer 20 may receive data signals from other system components.

Figure 2B:
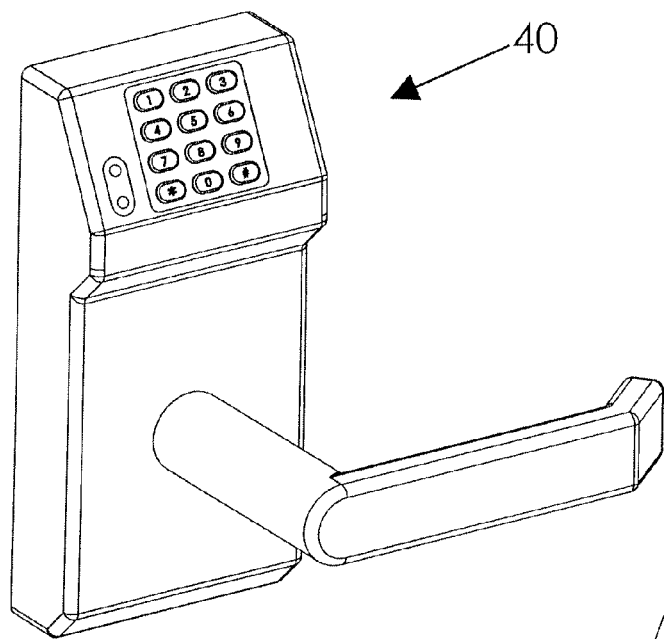
Figure 2C:
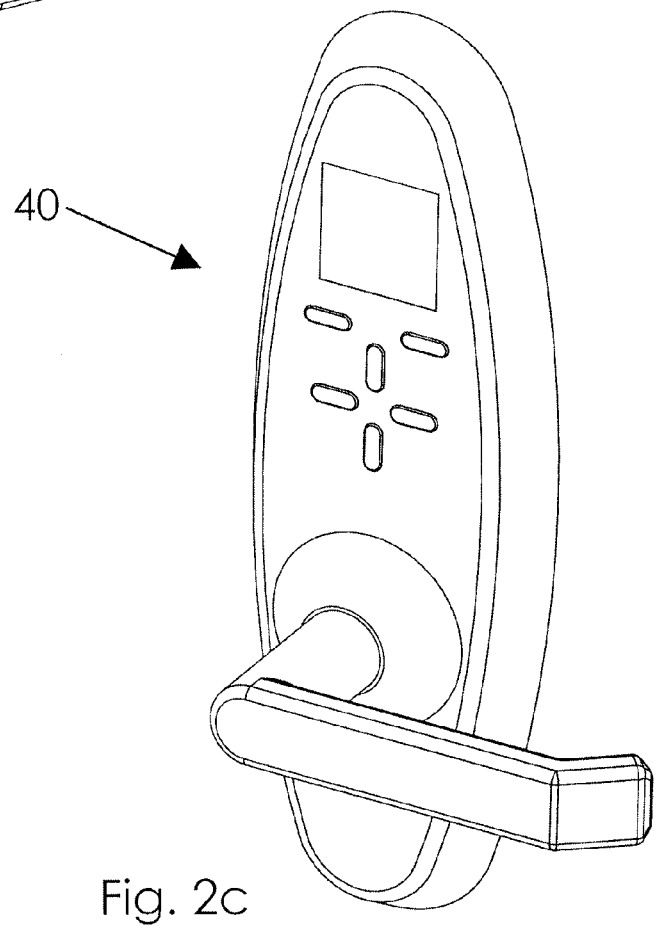
Figure 3:
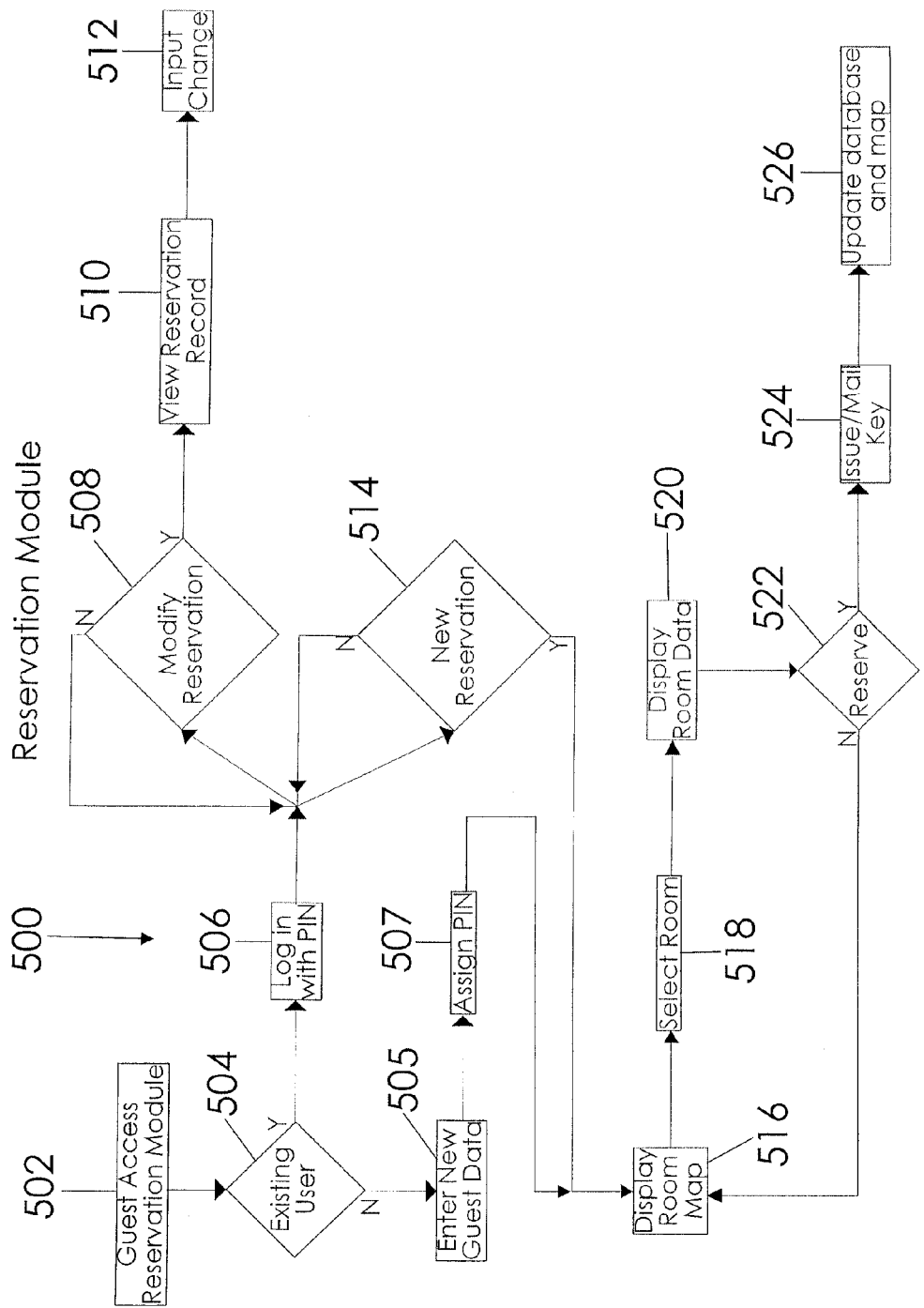
FIG. 3 is a flowchart illustrating the programming logic of a room reservation module according to the present invention.

The hotel room management system 10 includes a plurality of guest room door units 40. Each door unit 40 is coupled or operatively coupled to a guest room door (not shown) adjacent a door knob and door latch (FIGS. 1 to 3). Each guest room door unit 40 is in data communication with the communications network 12 and is configured to unlock a respective door lock when actuated by an authorized key. It is understood that an authorized door key may refer to a magnetically coded key card, a numeric keypad, a biometric fingerprint scanner, traditional key, or the like (FIGS. 1 to 3). When a key is manipulated relative to a respective door unit 40 such as swiping a key card, entering a keypad code, or scanning a fingerprint) data from the key is communicated to the computer 20 through the communications network. Each door unit 40 is configured to distinguish between two types of authorized keys, namely, a guest key and a housekeeping key. When a key is operated upon a door unit 40, the door unit 40 is configured to recognize an authorized key, whether a guest key or a housekeeping key, and to unlock the door accordingly. In addition, a door unit 40 is configured to communicate door key data to the computer 20 through the communications network. Programming using received door key data will be described later as it relates to housekeeping.

The hotel room management system 10 includes a plurality of guest room units 30, one guest room unit 30 being situated in each of the hotel's guest rooms. Each guest room unit 30 is in data communication with the communications network 12 so as to transmit and receive data signals to and from the hotel computer 20, respectively. Preferably, a guest room unit 30 is mounted on a wall near the room door so that a guest may conveniently indicate room status on the way in or out of the room.

A guest room unit 30 may be a touch screen device or similar computing device that is configured to receive input from a hotel guest, housekeeping personnel, or the like (FIG. 1). More particularly, the guest room unit 30 may be configured to receive projected absence data from a guest in a respective guest room. In other words, when a guest is preparing to leave his room for awhile, e.g. to attend a business meeting or to eat at a restaurant, the guest may indicate to the guest room unit his intention to leave and to choose a projected amount of time he anticipates being gone from the room. The guest room unit 30, therefore, may include an input device or programming to operate a touch screen interface. The guest room unit 30 is in data communication with the wireless network such that anticipated absence data entered into a guest room unit 30 is delivered to the computer 20 through the communications network 12. In this way, the hotel computer 20 is updated in real time when a guest is leaving and is informed of a window of time in which the room will be available for cleaning by a housekeeping staff. The processes regarding usage of the door units 40 and guest room units 30 will be described in more detail below.

Figure 6:
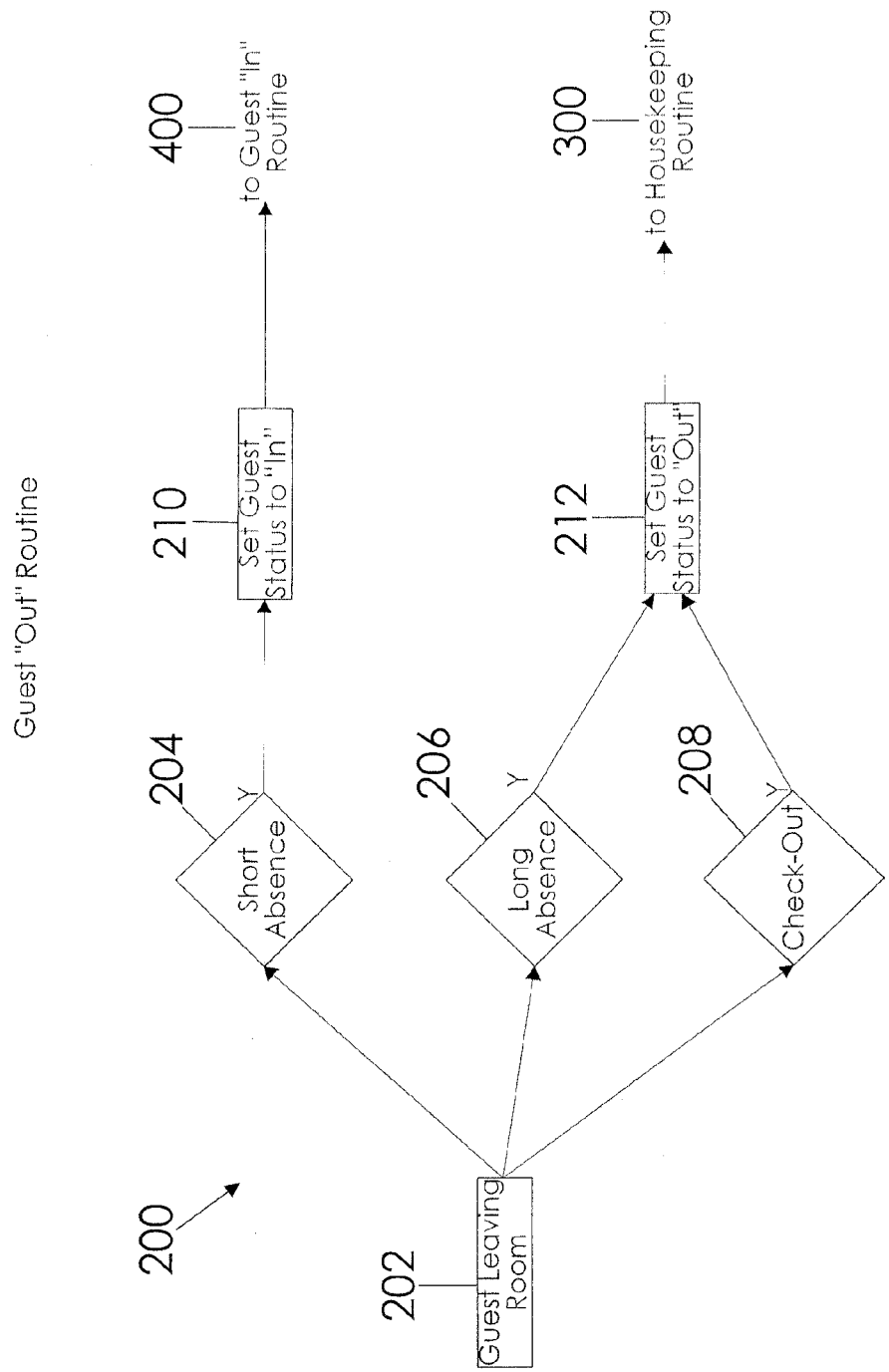
FIG. 6 is a flowchart illustrating the programming logic of a guest "out" routine according to the present invention.

FIG. 6 is a flowchart that illustrates operation of a programming process 200 and method steps according to the hotel room management system 10 as it relates to a guest leaving his reserved room for a period of time. The process 200 illustrated in FIG. 6 may also be referred to as the Guest "Out" routine. Specifically, at step 202, a guest may express an intention to leave his respective room by entering an appropriate input into guest room unit 30 associated with the guest's room. The process 200 then proceeds to a decision tree in which the guest may enter an appropriate input into the guest room unit 30 indicative of a projected length of time the guest anticipates being out of the room. It is understood that all three choices (short absence 204, long absence 206, check-out 206) may be displayed on a touch screen, as a list of choices to select from, or some other graphic user interface.

The length of time associated with a "short absence" 204 or "long absence" 206 may be defined on the screen or merely left to the guest's discretion. It is understood that once absence data has been entered into the guest room unit 30, the guest room unit 30 is configured to transmit the data to the hotel computer 20 through the communications network 12. Programming in memory when executed by the processor 24 receives transmitted projected absence data. If the choice of "short absence" 204 is selected by a guest, then the process 200 proceeds to step 210 at which a data structure associated with the guest occupancy of the respective guest room is set to "guest in" and stored in memory 22. The process 200 then proceeds to the "Guest In" routine 400 as will be described later. However, if the choice of "Long Absence" or "Checkout" is input into the guest room unit 30, then the process 200 proceeds to step 212 at which a data structure associated with the guest occupancy of the respective guest room is set to "guest out" and stored in memory 22. The process 200 then proceeds to the "Housekeeping" routine 300 as described in more detail below.

Projected absence data received into the computer 20 is stored in a respective data structure associated with the room from which it was received. Further, there is programming in memory 22 that when executed by the processor 24 determines if the received projected absence data is indicative of a housekeeping event and, if so, communicates a housekeeping order to a housekeeping unit or electronic housekeeping module 301 (FIG. 5). It is understood that the housekeeping module 301 may include an electronic device controlled by housekeeping personnel or may be an e-mail address monitored by housekeeping personnel. Specifically, if the guest has indicated he is leaving for a long time (say, 2 hours or more) or that he is checking out of the hotel, then the computer 20, under programming executed by the processor 24, automatically issues a cleaning order to the housekeeping module 301. The amount of time that qualifies as "short" or "long" is a predetermined parameter set by a hotel administrator.

Figure 4:
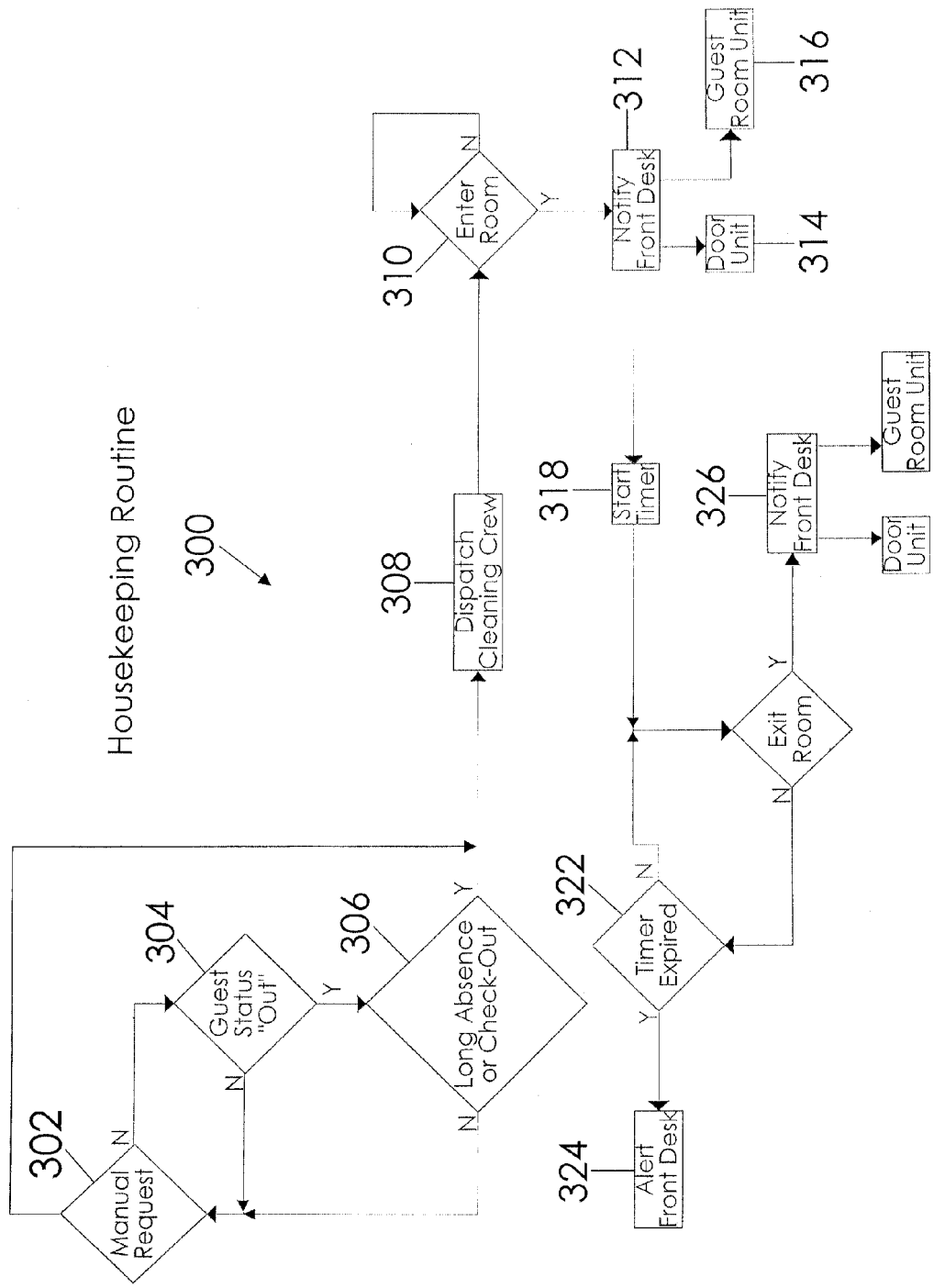
FIG. 4 is a flowchart illustrating the programming logic of a housekeeping module according to the present invention.

Turning now to the housekeeping process 300 illustrated in FIG. 4, the system 10 is configured to notify the hotel computer 20 (and thus the front desk) and a housekeeping module 301 in real time when a guest manually requests cleaning or indicates he is leaving for an amount of time deemed sufficient by the computer 20 to initiate a cleaning event relative to the requesting room. At step 302, the processor 24 under program control determines if a guest has manually requested housekeeping, regardless of whether the guest is leaving the guest room or not. If the guest has manually requested housekeeping, then the process 300 proceeds to step 308 where a housekeeping crew is immediately dispatched. In operation, a guest may make a manual request from a respective guest room unit 30 at anytime, the guest room unit 30 being configured to automatically communicate the manual request to the housekeeping module 301 and to the hotel computer 20 through the communications network 12 so that the room status may be updated in real time. It is also contemplated that the system 10 may be configured such that a respective guest room unit 30 may be accessed by an authorized guest from a cellular telephone or wireless computer, whereby to manually request housekeeping or to give other commands.

At step 302, if a manual request was not made, then the process 300 proceeds to step 304. At step 304, the processor 24 determines if the guest status data structure is set to "out," as described previously, and, if so, proceeds to step 306. Otherwise, the process 300 returns to step 302. At step 306, the processor 24 determines if the received projected absence data is indicative of a long absence or checkout in which case the process 300 proceeds to step 308. Otherwise, the process 300 returns to step 302. At step 308, the processor 24 communicates a housekeeping order to the housekeeping module 301 through the communications network 12 which effectively dispatches a housekeeper or housekeeping crew to the respective guest room for cleaning. It is understood that the hotel computer 20 may also receive notice of the housekeeping request so as to monitor entry into and exit from the room by housekeeping as will be described below. The process 300 then proceeds to step 310.

At step 310, the processor 24 determines if the respective guest room to be cleaned has been entered by a housekeeper. Data related to room entry may be gathered and communicated to the processor 24 in one of two ways or both ways. First, the computer 20 may receive room entry data when a housekeeping key—an authorized key—is used to actuate a guest room door unit 40 as discussed above or when the door unit 40 is actuated by a guest key. Second, the hotel computer 20 may receive room entry data when room entry by housekeeping is entered into a respective guest room unit 30 and that data is communicated to the hotel computer 20 through the communications network 12. In this manner, the front desk is notified that housekeeping has entered a room as indicated at block 312 and the means for entry is determined at blocks 314 (from a respective door unit 40) and 316 (from a respective guest room unit 30).

After determining that a respective room has been entered by housekeeping, the process 300 proceeds to step 318. At step 318, the processor 24 actuates a timer that is set to a predetermined amount of time, the timer being used to determine the amount of time housekeeping personnel have been inside the respective room to be cleaned. After actuating the timer, the process 300 proceeds to step 320. At step 320, the processor executes programming to determine if housekeeping has exited the room and if so, proceeds to step 326. Otherwise, the process 300 proceeds to step 322. At step 322, the processor 24 determines if the timer has expired (indicating cleaning has taken longer than it should) and, if so, proceeds to step 324 at which the hotel computer 20 and consequently the front desk are signaled through the communications network 12. Presumably, the front desk would contact housekeeping to determine the reason for the delay in completing the cleaning of the room. If, however, the timer has not expired, then the process 300 proceeds from step 322 to step 320.

When housekeeping has left the room, the hotel computer 20 is notified at step 326, such as by housekeeping actuating the door unit 40 with the housekeeping key or by operating the guest room unit 30 as indicated at blocks 328 and 330, respectively. It is understood that by monitoring entry and exit of housekeeping personnel relative to a guest room, the occupancy status thereof is monitored in real time. In other words, the front desk maintains an awareness of who is or is not in the room (i.e. the guest or housekeeping personnel) which can assist the hotel in providing excellent service, guest satisfaction, and efficient management of personnel.

In some embodiments, an alternative to housekeeping indicating its presence in a guest room by using a respective room unit or door key is the use of Radio Frequency Identification Devices ("RFID") (not shown). More particularly, an RFID reader may be positioned in each guest room and a housekeeping employee may be required to carry or wear an RFID badge having a transmitter. A respective RFID reader may be configured to determine the proximal presence of a respective RFID badge/transmitter. The RFID receiver may be in data communication with the hotel computer via the communications network such that the hotel computer is made aware when the housekeeping employee is or is not in a particular guest room. In this embodiment, the real time status of a room is determined as well as maintaining valuable information on the work efficiency of a housekeeping employee.

Figure 7:
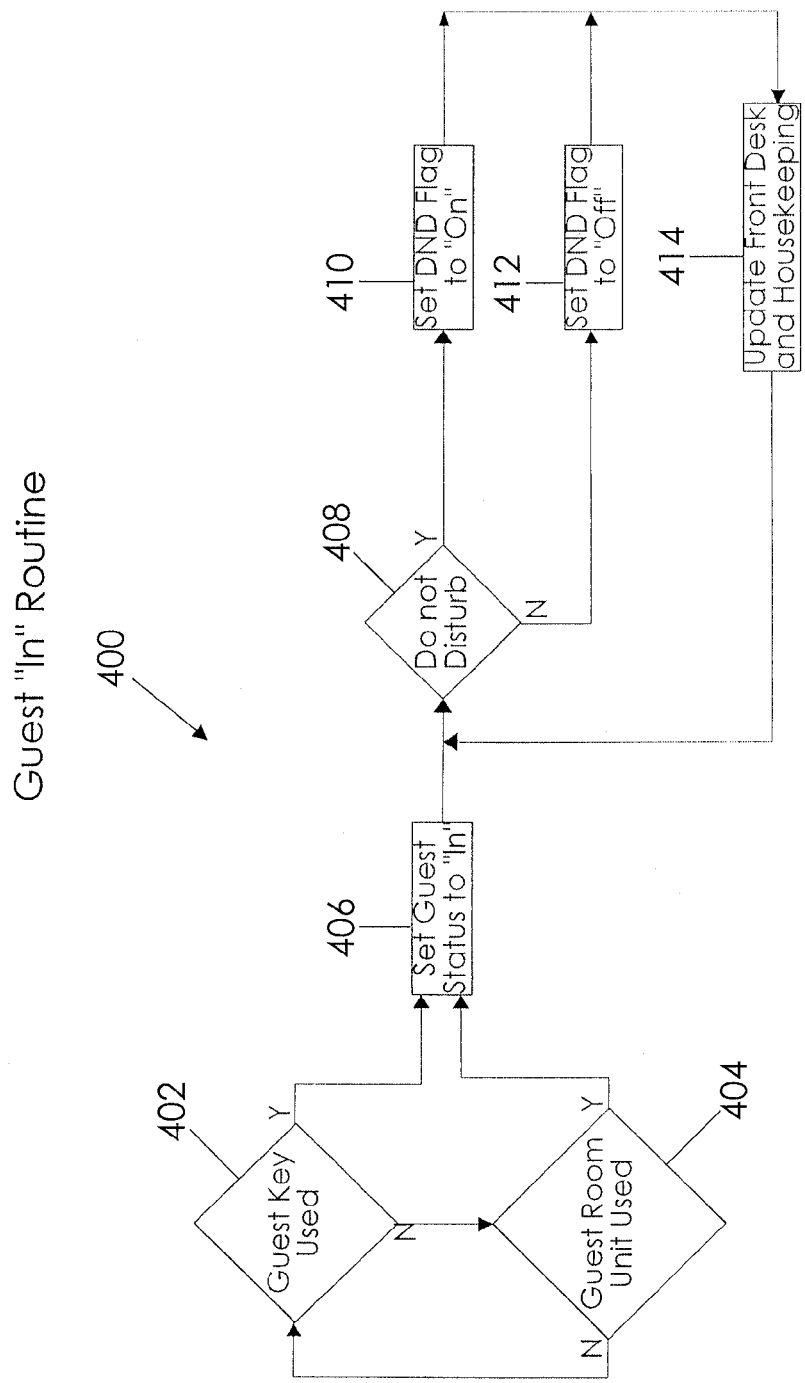
FIG. 7 is a flowchart illustrating the programming logic of a guest "in" routine according to the present invention.

Turning now to FIG. 7, the system 10 includes programming related to monitoring the occupancy status of a guest room when the guest is, in fact, in the room. First, in the process 400 illustrated in FIG. 3, the processor 24 under program control determines at step 402 if the authorized guest for a respective room has entered the room by using the guest key assigned to that room. As a practical matter, a guest may swipe a magnetically encoded card through the associated door unit 40, operation of the door unit 40 being automatically communicated to the hotel computer 20 through the communication network 12. If the processor 24 determines that the authorized guest has entered the room as a result of actuation of the respective door unit 40, then the process 400 proceeds to step 406. Otherwise, the process 400 proceeds to step 402. At step 402, the processor 24 determines if the guest has entered the room and then indicates this status using the respective guest room unit 30. If the guest room unit 30 was used to indicate guest occupancy, then the process proceeds to step 406. This condition may occur when the guest returns while housekeeping is still in the room or another authorized guest is already in the room—making it unnecessary for the guest to actuate the door unit 40 to unlock the door.

At step 406, the processor 24 sets a guest room occupancy data structure to "in" and the process 400 proceeds to step 408. At step 408, the processor 24 determines if the guest has selected a "Do-not-Disturb" status on the guest room unit 30, the status being automatically communicated to the hotel computer 20 through the communications network 12. If, in fact, a "Do-not-Disturb" status was selected, then the process 400 proceeds to step 410 at which the processor 24 causes a respective data structure or flag to be set to "on." Similarly, if a "Do-not-Disturb" status was not selected at step 408, then the process 400 proceeds to step 412 at which the processor 24 causes a respective data structure or flag to be set to "off." After step 410 or 412, respectively, the process 400 proceeds to step 414 at which the front desk and housekeeping modules are updated/notified not to disturb the guest in the respective guest room.

Turning now to FIG. 3, the programming in memory 22, when executed by the processor 24, operates a room reservation process 500. At step 502, a potential guest is able to access the reservation process 500 through the internet. It is understood that the reservation process 500 may be operating electronically on the hotel computer 20 in network communication with the internet. It is also understood that a user (i.e. a potential hotel guest) may access the reservation module from a home computer 14. At step 504, the processor 24 determines if the user accessing the reservation process 500 is an existing user and, if so, the process 500 proceeds to a decision tree involving steps 508 and 514 as will be discussed below. But if the processor 24 determines at step 504, that the guest accessing the reservation module is not an existing user, then the process 500 proceeds to step 505 where new user data is entered into respective data structures and stored in memory 22 or, more particularly, in the database 26. After new user data entry, the process proceeds to step 507 where a Personal Identification Number (PIN) or other authorization code is assigned to the new user. It is understood that the personal identifier will be used to identify the user with a room or rooms later reserved by the user. After step 507, the process proceeds to step 576 which will be described later.

In the case of an existing user, the process 500 encounters a decision tree leading either to step 508 or step 514. In practice, the user accessing the reservation module/process 500 via the internet may be presented with a menu of options and the existing user may select whether he desires to modify a previously made reservation or to make a new reservation. If the processor 24 determines at step 508 that the existing user desires to modify a previously made reservation, then the process 500 proceeds to step 570. At step 570, the processor will retrieve the existing reservation data from memory 22 and that data may be displayed on the user's computer 14. The process 500 then proceeds to step 512. At step 512, the existing user is enabled to enter changes to the reservation. If the processor 24 determines at step 514 that the user desires to make a new reservation, the process proceeds to step 516.

At step 516, the processor 24 retrieves and displays an up to date overall hotel room map by accessing real time room occupancy data from memory 22 and communicating it over the internet to the user's computer display. It is understood that the room occupancy data may be configured as a map of all rooms with an indicator which rooms are currently occupied or rented and which rooms are available to reserve on specific dates in the future. After displaying an overall room map including occupancy status by date, the process 500 proceeds to step 518 at which the user may select a room about which to learn more information. The room occupancy data may include specific data concerning any selected room, including room cost, amenities, smoking status, and the like. The process 500 then proceeds to step 520 at which appropriate room specific information or perhaps a picture may be displayed. The purpose of displaying room data of available rooms is to enable the accessing user to make an informed decision on whether or not to make a reservation of a particular room. After displaying data regarding a selected room at step 520, the process 500 proceeds to step 522.

At step 522, the processor 24 executes appropriate programming to determine if the user desires to reserve the selected room and, if so, proceeds to step 524. Otherwise, the process 500 returns to step 516 at which the map of available rooms is displayed again from which a user may select another room. At step 524, the processor 24 directs that a guest key (also referred to as a room access code) be created or assigned that may include room identification data and guest data (such as the user's PIN or other unique identifier). The guest key may be a key card as is traditional for swiping or being inserted into a door unit. Alternatively, the guest key may be a code for entry into a keypad type lock. In enhanced embodiments of this invention, the access code may be a guest's thumbprint or fingerprint that may be recognized by a complementary biometric scanner that is incorporated into a guest room door lock. It is understood the term "guest key" should be interpreted to include the various technologies described herein and their equivalents. Accordingly, it is understood that the guest key is configured to actuate the room door unit 40 as described previously, i.e. to cause the door to be unlocked and allow access to the room. In practice, the guest room access key or code may be supplied to a guest by way of the internet upon making a reservation, by e-mail, or by text message. In this way, a guest is able to bypass the front desk upon arrival at the hotel and go straight to the reserved room. If a guest is a frequent guest of the hotel, he may be assigned a personal and permanent access code or key to gain entry to a reserved room.

The room will be ready for the guest's arrival in that the occupancy status and reservation is known to the hotel and housekeeping in advance of the guest's arrival. Finally, the process 500 proceeds to step 526 at which the occupancy data structures in memory, including the room map, may be updated such that the map and hotel computers reflect a real time occupancy status and reservation status.

In use, a user of the present system 10 may first access the reservation module/process 500 from a remote computer such as a home computer 14, browse available rooms from a display/map of available rooms, and ultimately make a reservation. Upon making a reservation, a guest key or other room access means configured to actuate a door unit 40 of the reserved room will be issued and delivered to the guest so that he may go directly to the hotel room and enter it without stopping first and checking in. The hotel computer 20 will be automatically notified of the guest's arrival and occupancy of the reserved room upon operation of the respective door unit 40 as described above regarding the Guest "in" routine illustrated in FIG. 7. Upon entry into the room using the guest key or by using the guest room unit 30, the guest status data structure is set to "in" and all relevant hotel personnel are notified in real time. A guest may further use the guest room unit 30 to set a "do-not-disturb" status and all relevant hotel personnel are notified in real time. This is particularly advantageous so that housekeeping is made aware—without physically visiting the room—not to attempt to clean the room at that time.

If or when a guest desires to leave the room, say, for a business meeting or just a trip to the ice machine, the guest may use the guest room unit 30 to indicate he is leaving for a "long" or "short" time or even to "check-out" of the hotel. This entry is received by the hotel computer via the communications network 12 as described above and enables the computer to decide, based on predetermined parameters, if housekeeping should be contacted to clean the room or not. The guest, of course, may make a request for an immediate visit from housekeeping at any time.

If housekeeping is dispatched to a respective guest room, their entry and exit is monitored and timed. For instance, a housekeeper's use of an authorized door key to actuate a respective door unit 40 is communicated to the hotel computer 20. Housekeeping may also use the in-room guest room unit 30 to log its entry and exit. According to the housekeeping routine 300, the occupancy of a respective guest room by housekeeping is made known to the hotel computer 20 (and front desk attendant) in real time.

Accordingly, the system 10 and method for hotel room management according to the present invention provides real time occupancy data to a hotel computer and front desk attendant at all times, whether occupancy of a room is by a guest, housekeeping, or neither. The present invention increases both hotel efficiency, profitability, and guest satisfaction.

It is understood that while certain forms of this invention have been illustrated and described, it is not limited thereto except insofar as such limitations are included in the following claims and allowable functional equivalents thereof.

The invention claimed is:

1. A wireless network hotel room management system for use by a hotel having a plurality of guest rooms for reserving a room, indicating the real time occupancy status of a room, and indicating the real time status of a housekeeping event, said system comprising:
   a communications network configured to send and receive wireless data signals;
   a computer in data communication with said communications network having a memory configured to store programming and data, said computer having a processor configured to execute said programming;
   a guest room unit situated in each guest room, each said guest room unit being in data communication with said communications network;
   a housekeeping module in data communication with said computer and said communications network;
   wherein said each guest room unit includes a touch screen that is configured to receive projected absence data as input from a guest in a respective guest room and to communicate said projected absence data to said computer through said communications network;
   programming in said memory that when executed by said processor receives said projected absence data from a respective guest room unit;
   programming in said memory that when executed by said processor determines if respective received projected absence data is indicative of a housekeeping request and, if so, communicates a housekeeping order to said housekeeping module;
   wherein said projected absence data is indicative of said housekeeping request if said projected absence data input from the guest indicates a respective guest is checking out or will be absent from the room for more than a predetermined amount of time other than checking out.

2. The system as in claim 1, wherein said each guest room unit is configured to receive housekeeping initiation data from housekeeping personnel when said housekeeping personnel have entered a guest room as a result of a respective housekeeping order and to communicate said housekeeping initiation data to said computer through said communications network.

3. The system as in claim 2, wherein said each guest room unit is configured to receive housekeeping completion data from said housekeeping personnel when said housekeeping personnel have completed cleaning a guest room as a result of said respective housekeeping order and to communicate said housekeeping completion data to said computer through said communications network.

4. The system as in claim 3, further comprising programming in said memory that when executed by said processor determines if a time between a receipt of said initiation data and a receipt of said completion data is greater than a predetermined time.

5. The system as in claim 1, further comprising:
   a guest room door unit situated on a respective guest room door and in communication with said communications network, said guest room door unit configured to automatically unlock said respective guest room door if actuated by an authorized key;
   wherein:
      said authorized key is one of a guest key and a housekeeping key;
      said room door unit is configured to distinguish between said guest key and said housekeeping key; and
      said room door unit is configured to communicate with said computer through said communications network when said respective door unit is actuated by said housekeeping key.

6. The system as in claim 1, further comprising:
   a guest room door unit situated on a respective guest room door and in communication with said communications network, said guest room door unit configured to automatically unlock said respective guest room door if actuated by an authorized key;
   wherein:
      said authorized key is one of a guest key and a housekeeping key;
      said guest room door unit is configured to distinguish between said guest key and said housekeeping key;
      said guest room door unit is configured to communicate with said computer through said communications network when said respective guest door unit is actuated a first time by said housekeeping key indicative that housekeeping personnel have entered a respective guest room as a result of a respective housekeeping order; and
      said guest room door unit is configured to communicate with said computer through said communications network when said respective guest room door unit is actuated a second time by said housekeeping key indicative that housekeeping personnel have left a respective guest room.

7. The system as in claim 6, further comprising programming in said memory that when executed by said processor determines if a time between a receipt of said respective guest room door unit being activated said first time and a receipt of said respective guest room door unit being activated said second time is greater than a predetermined time.

8. The system as in claim 1, further comprising:
   a guest room door unit situated on a respective guest room door and in communication with said communications network, said guest room door unit configured to automatically unlock said respective guest room door when actuated by a guest key;
   wherein said room door unit is configured to communicate with said computer through said communications network when said respective door unit is actuated by an associated guest key;
   programming in said memory that when executed by said processor receives door unit access status data from a respective room door unit;
   programming in said memory that when executed by said processor sets a guest room status data structure associated with a respective guest room to "in" when said received door unit access status is indicative of actuation of said respective door unit having been actuated by said associated guest key.

9. The system as in claim 8, wherein said guest room unit is configured to receive "do-not-disturb" data from a guest in a respective guest room and to communicate said do-not-disturb data to said computer through said communications network;
   said system further comprising:
      programming in said memory that when executed by said processor receives said do-not-disturb data from a respective guest room unit;
      programming in said memory that when executed by said processor determines if respective received donot-disturb data is indicative of a request not to be disturbed and, if so, communicates a do-not-disturb order to said housekeeping module.

10. The system as in claim 1, further comprising:
programming in said memory that when executed by said processor connects said communication network with a wide area network to enable a new guest seeking a guest room reservation to access said computer;
programming in said memory that when executed by said processor determines if the new guest desires to make a new reservation and, if so, displays a map of available rooms;
programming in said memory that when executed by said processor enables a new guest to select a room from said map of available rooms;
programming in said memory that when executed by said processor determines if said new guest desires to reserve said selected room;
programming in said memory that when executed by said processor directs a guest key associated with said reserved room to be delivered to said new guest if said new guest has reserved said selected room; and
programming in said memory that when executed by said processor updates said map of available rooms and said memory to reflect said reserved room.

11. The system as in claim 2, further comprising:
programming in said memory that when executed by said processor connects said communication network with a wide area network to enable a new guest seeking a guest room reservation to access said computer;
programming in said memory that when executed by said processor determines if said new guest desires to make a new reservation and, if so, displays a map of available rooms;
programming in said memory that when executed by said processor enables a new guest to select a room from said map of available rooms;
programming in said memory that when executed by said processor determines if said new guest desires to reserve said selected room;
programming in said memory that when executed by said processor directs a guest key associated with said reserved room to be delivered to said new guest if said new guest has reserved said selected room; and
programming in said memory that when executed by said processor updates said map of available rooms and said memory to reflect said reserved room.

12. The system as in claim 4, further comprising:
programming in said memory that when executed by said processor connects said communication network with a wide area network to enable a new guest seeking a guest room reservation to access said computer;
programming in said memory that when executed by said processor determines if said new guest desires to make a new reservation and, if so, displays a map of available rooms;
programming in said memory that when executed by said processor enables a new guest to select a room from said map of available rooms;
programming in said memory that when executed by said processor determines if said new guest desires to reserve said selected room;
programming in said memory that when executed by said processor directs a guest key associated with said reserved room to be delivered to said new guest if said new guest has reserved said selected room; and
programming in said memory that when executed by said processor updates said map of available rooms and said memory to reflect said reserved room.

13. The system as in claim 8, further comprising:
programming in said memory that when executed by said processor connects said communication network with a wide area network to enable a new guest seeking a guest room reservation to access said computer;
programming in said memory that when executed by said processor determines if said new guest desires to make a new reservation and, if so, displays a map of available rooms;
programming in said memory that when executed by said processor enables a new guest to select a room from said map of available rooms;
programming in said memory that when executed by said processor determines if said new guest desires to reserve said selected room;
programming in said memory that when executed by said processor directs a guest key associated with said reserved nom to be delivered to said new guest if said new guest has reserved said selected room; and
programming in said memory that when executed by said processor updates said map of available rooms and said memory to reflect said reserved room.

14. A method for using a wireless network to manage a hotel having a plurality of guest rooms, comprising the steps of:
providing a communications network configured to send and receive wireless data signals;
providing a computer in data communication with said communications network having a memory configured to store programming and data, said computer having a processor configured to execute said programming;
providing an electronic guest room unit situated in each guest room, each said guest room unit being a touch screen input device that is in data communication with said communications network;
providing a housekeeping module in data communication with said computer and said communications network;
receiving into said guest room unit projected absence data input by a guest and communicating said projected absence data to said computer through said communications network; and
determining if respective received projected absence data is indicative of a housekeeping request and, if so, communicating a housekeeping order to said housekeeping module, wherein said projected absence data is indicative of said housekeeping request if said projected absence data indicates a respective guest is checking out or will be absent from the room for more than a predetermined amount of time other than to check out.

15. The method as in claim 14, further comprising the steps of:
receiving housekeeping initiation data from housekeeping personnel when said housekeeping personnel have entered a guest room as a result of a respective housekeeping order and communicating said housekeeping initiation data to said computer through said communications network; and
receiving housekeeping completion data from housekeeping personnel when said housekeeping personnel have completed cleaning a guest room as a result of a respective housekeeping order and to communicate said housekeeping completion data to said computer through said communications network.

16. A method as in claim 15, determining if a time between a receipt of said housekeeping initiation data and a receipt of said housekeeping completion data is greater than a predetermined time.

17. A method as in claim 14, further comprising:
providing a guest room door unit situated on a respective guest room door and in communication with said communications network, said guest room door unit configured to automatically unlock said respective guest room door when actuated by a guest key;
communicating to said computer when a respective door unit has been actuated by an associated guest key;
said computer setting a guest room status data structure associated with a respective guest room to "in" when said respective guest room door has been actuated by said associated guest key.

18. The method as in claim 17, further comprising:
enabling a new guest considering a guest room reservation to access said computer using the internet;
displaying a map of available rooms if said new guest desires to make a guest room reservation;
enabling said new guest to select an available guest room from said display of available rooms;
delivering a guest key associated with a selected guest room to said new guest if said new guest makes a reservation thereof; and
updating said map of available rooms as a result of said guest room reservation.

19. A wireless network hotel room management system for use by a hotel having a plurality of guest rooms for reserving a room, indicating the real time occupancy status of a room, and indicating the real time status of a housekeeping event, said system comprising:
a communications network configured to send and receive wireless data signals;
a computer in data communication with said communications network having a memory configured to store programming and data, said computer having a processor configured to execute said programming;
a guest room unit situated in each guest room, each said guest room unit being in data communication with said communications network;
a housekeeping module in data communication with said computer and said communications network;
wherein said each guest room unit includes a touch screen that is configured to receive projected absence data as input from a guest in a respective guest room and to communicate said projected absence data to said computer through said communications network;
programming in said memory that when executed by said processor receives said projected absence data from a respective guest room unit;
programming in said memory that when executed by said processor determines if respective received projected absence data is indicative of a housekeeping request and, if so, communicates a housekeeping order to said housekeeping module;
wherein said projected absence data is indicative of said housekeeping request if said projected absence data input from the guest indicates a respective guest is checking out or will be absent from the room for more than a predetermined amount of time other than checking out;
wherein said each guest room unit is configured to receive housekeeping initiation data from housekeeping personnel when said housekeeping personnel have entered a guest room as a result of a respective housekeeping order and to communicate said housekeeping initiation data to said computer through said communications network;
wherein said each guest room unit is configured to receive housekeeping completion data from said housekeeping personnel when said housekeeping personnel have completed cleaning a guest room as a result of said respective housekeeping order and to communicate said housekeeping completion data to said computer through said communications network;
programming in said memory that when executed by said processor determines if a time between a receipt of said initiation data and a receipt of said completion data is greater than a predetermined;
a guest room door unit situated on a respective guest room door and in communication with said communications network, said guest room door unit configured to automatically unlock said respective guest room door if actuated by an authorized key;
wherein:
said authorized key is one of a guest key and a housekeeping key;
said room door unit is configured to distinguish between said guest key and said housekeeping key; and
said room door unit is configured to communicate with said computer through said communications network when said respective door unit is actuated by said housekeeping key;
wherein said guest room unit is configured to receive "do-not-disturb" data from a guest in a respective guest room and to communicate said do-not-disturb data to said computer through said communications network;
said system further comprising programming in said memory that when executed by said processor:
receives said do-not-disturb data from a respective guest room unit; and
determines if respective received do-not-disturb data is indicative of a request not to be disturbed and, if so, communicates a do-not-disturb order to said housekeeping module.

20. The system as in claim 19, further comprising programming in said memory that when executed by said processor:
connects said communication network with a wide area network to enable a new guest seeking a guest room reservation to access said computer;
determines if said new guest desires to make a new reservation and, if so, displays a map of available rooms;
enables a new guest to select a room from said map of available rooms;
determines if said new guest desires to reserve said selected room;
directs a guest key associated with said reserved room to be delivered to said new guest if said new guest has reserved said selected room; and
updates said map of available rooms and said memory to reflect said reserved room.

* * * * *